(12) United States Patent
Babu Narayanan et al.

(10) Patent No.: US 12,272,955 B2
(45) Date of Patent: Apr. 8, 2025

(54) BIPOLE POWER TRANSMISSION SCHEMES

(71) Applicant: General Electric Technology GmbH, Baden (CH)

(72) Inventors: Mita Babu Narayanan, Stafford (GB); Omar Jasim, Stafford (GB); Carl Barker, Stafford (GB)

(73) Assignee: GE Infrastructure Technology LLC, Greenville, SC (US)

( * ) Notice: Subject to any disclaimer, the term of this patent is extended or adjusted under 35 U.S.C. 154(b) by 242 days.

(21) Appl. No.: 17/998,214

(22) PCT Filed: May 21, 2021

(86) PCT No.: PCT/EP2021/063649
§ 371 (c)(1),
(2) Date: Nov. 8, 2022

(87) PCT Pub. No.: WO2021/234145
PCT Pub. Date: Nov. 25, 2021

(65) Prior Publication Data
US 2023/0223759 A1 Jul. 13, 2023

(30) Foreign Application Priority Data
May 22, 2020 (EP) .................................. 20275094

(51) Int. Cl.
*H02J 3/36* (2006.01)
*H02J 3/38* (2006.01)
*H02J 3/40* (2006.01)

(52) U.S. Cl.
CPC ............... *H02J 3/36* (2013.01); *H02J 3/381* (2013.01); *H02J 3/40* (2013.01); *H02J 2300/28* (2020.01)

(58) Field of Classification Search
CPC ...... H02J 3/00; H02J 3/36; H02J 3/381; H02J 3/40; H02J 2300/28
See application file for complete search history.

(56) References Cited

U.S. PATENT DOCUMENTS

| 8,772,969 B2 * | 7/2014 | Jung ...................... H02J 9/061 307/86 |
| 2012/0175962 A1 * | 7/2012 | Zhan ...................... H02J 1/102 307/82 |

(Continued)

FOREIGN PATENT DOCUMENTS

EP 2713468 A1 4/2014

OTHER PUBLICATIONS

International Search Report and Written Opinion in PCT/EP2021/063649 dated Jul. 22, 2021 (15 pages).

(Continued)

*Primary Examiner* — Elim Ortiz
*Assistant Examiner* — Joseph N Inge
(74) *Attorney, Agent, or Firm* — Eversheds Sutherland (US) LLP

(57) ABSTRACT

A bipole power transmission scheme includes a first converter station positioned in-use remote from a second converter station, and first and second transmission conduits to in-use interconnect the first converter station with the second converter station and thereby permit the first converter station to transmit power to the second converter station. The first converter station includes a first power converter, a second power converter, and a converter station controller which is programmed to selectively transition the bipole power transmission scheme into an asymmetrical monopole configuration, while maintaining the transfer of power from both the first and second power sources.

10 Claims, 2 Drawing Sheets

(56) References Cited

U.S. PATENT DOCUMENTS

| | | | |
|---|---|---|---|
| 2013/0197704 A1* | 8/2013 | Pan | H02J 3/381 363/35 |
| 2014/0092650 A1* | 4/2014 | Alston | H02J 3/381 363/35 |
| 2017/0009738 A1* | 1/2017 | Brogan | H02J 3/381 |
| 2018/0109109 A1* | 4/2018 | Holmgren | H02J 1/06 |

OTHER PUBLICATIONS

Erlich, "New Control of Wind Turbines Ensuring Stable and secure Operation Following Islanding of Wind Farms," IEEE Transaction on Energy Conversion, vol. 32, No. 3, Sep. 2017 (9 pages).

* cited by examiner

# BIPOLE POWER TRANSMISSION SCHEMES

TECHNICAL FIELD

This invention relates to a bipole power transmission scheme, i.e. a bipole power transmission apparatus, and to a method of operating such a scheme.

BACKGROUND OF THE INVENTION

In high voltage direct current (HVDC) power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to effect the required conversion from AC to DC or from DC to AC.

The choice of the most suitable HVDC power transmission scheme, i.e. power transmission apparatus, within a HVDC power transmission network differs, depending on the application and scheme features. One type of such scheme is a bipole power transmission scheme, i.e. a bipole power transmission apparatus.

SUMMARY OF THE INVENTION

According to a first aspect of the invention there is provided a bipole power transmission scheme comprising a first converter station positioned in-use remote from a second converter station, and first and second transmission conduits to in-use interconnect the first converter station with the second converter station and thereby permit the first converter station to transmit power to the second converter station, the first converter station including:
a first power converter electrically interconnecting the first transmission conduit with a first variable power source and in-use transferring power from the first power source into the first transmission conduit; and
a second power converter electrically interconnecting the second transmission conduit with a second variable power source and in-use transferring power from the second power source into the second transmission conduit,
the bipole transmission scheme further including a converter station controller programmed to selectively transition the bipole power transmission scheme into an asymmetrical monopole configuration, while maintaining the transfer of power from both the first and second power sources, by:
electrically interconnecting the first and second power sources;
configuring one power converter connected to the transmission conduit intended to continue transmitting power in the monopole configuration as a master converter operating in a grid-forming mode;
configuring the other power converter connected to the transmission conduit intended to cease transmitting power in the monopole configuration as a slave converter operating in a grid-following mode; and
controlling the slave converter to reduce to zero the power being fed into the transmission conduit connected therewith.

Having such converter station controller so programmed permits the said transition to an asymmetric monopole configuration while avoiding an interruption in power transfer from both power sources, and hence without causing a highly undesirable interruption of power in any downstream power transmission network associated therewith which is being supplied by the first and second power sources.

In addition, including in the invention a converter station controller that carries out the foregoing steps results in the power from both power sources passing solely through the master converter and into the transmission conduit connected therewith, but nevertheless still into a downstream power transmission network that in-use is associated therewith, thus avoiding an interruption in the power in the said downstream power transmission network.

The converter station controller may be further programmed, once the power being fed into the transmission conduit connected with the slave converter reaches zero, to disconnect the slave converter from the electrically interconnected first and second power sources.

Such a further step electrically isolates the slave converter, and hence also the transmission conduit connected therewith, and so allows safe working, e.g. for planned maintenance or repair, on that transmission conduit.

Optionally the first and second power sources are interconnected temporarily at a point of common coupling.

Adopting a point of common coupling at which to interconnect the first and second power sources provides a convenient means of achieving such interconnection, not least because such a point of common coupling is often located within the first converter station and thereby near to each power converter.

In another preferred embodiment of the invention, prior to interconnecting the first and second power sources, the converter station controller is programmed to synchronise the voltages and frequencies of the first and second power sources with one another.

Synchronising the voltage and frequency of the first power source with the voltage and frequency of the second power source desirably reduces the risk of damage occurring to the first and second power converters and first converter station when such interconnection takes place.

Preferably, following interconnection of the first and second power sources, droop control is initially applied to both power converters.

Applying such droop control to both power converters prevents any interaction between respective converter controllers of the power converters, while nevertheless permitting a sharing of the power between the first and second power sources.

In a further preferred embodiment of the invention, the master converter operating in a grid-forming mode maintains the voltage and frequency of the power source with which it is connected.

In a still further preferred embodiment of the invention the slave converter operating in a grid-following mode measures the voltage and frequency of the power source with which it is connected in order to synchronise its output voltage with the said power source.

The foregoing steps desirably permit one power converter, i.e. that configured as a master converter, to assume overall control of electrically interconnected first and second power sources, and another power converter, i.e. that configured as a slave converter, to modify its output according to the voltage and frequency of the interconnected first and second power sources.

Hence the voltage and frequency set and maintained by the master converter is able to act as a reference which can be followed by the slave converter, and thereby the master converter is able to exhibit a necessary degree of control over the slave converter, without the need for a dedicated communication channel between the converters.

Optionally the first converter station is an offshore converter station and at least one of the first and second power sources is an offshore wind park.

The drive to reduce carbon emissions means that there is an increasing demand for renewable energy sources, and so the applicability of the invention to offshore wind parks is very advantageous.

The bipole power transmission scheme may include a second converter station interconnected with the first converter station by the first and second transmission conduits.

Including such a second converter station provides the opportunity for end-to-end control of the entire bipole power transmission scheme.

According to a second aspect of the invention there is provided a method of operating a bipole power transmission scheme comprising a first converter station positioned in-use remote from a second converter station, and first and second transmission conduits to in-use interconnect the first converter station with the second converter station and thereby permit the first converter station to transmit power to the second converter station, the first converter station including:
a first power converter electrically interconnecting the first transmission conduit with a first variable power source and in-use transferring power from the first power source into the first transmission conduit; and
a second power converter electrically interconnecting the second transmission conduit with a second variable power source and in-use transferring power from the second power source into the second transmission conduit,
the bipole power transmission scheme further including a converter station controller, and
the method comprising the step of having the converter station controller selectively transition the bipole power transmission scheme into an asymmetrical monopole configuration, while maintaining the transfer of power from both the first and second power sources, by:
electrically interconnecting the first and second power sources;
configuring one power converter connected to the transmission conduit intended to continue transmitting power in the monopole configuration as a master converter operating in a grid-forming mode;
configuring the other power converter connected to the transmission conduit intended to cease transmitting power in the monopole configuration as a slave converter operating in a grid-following mode; and
controlling the slave converter to reduce to zero the power being fed into the transmission conduit connected therewith.

The method of the invention shares the benefits of the corresponding features of the bipole power transmission scheme of the invention.

It will be appreciated that the use of the terms "first" and "second", and the like, in this patent specification is merely intended to help distinguish between similar features (e.g. the first and second transmission conduits, and the first and second power converters), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWING

There now follows a brief description of preferred embodiments of the invention, by way of non-limiting example, with reference being made to the following figures in which.

DETAILED DESCRIPTION

Figure 1:
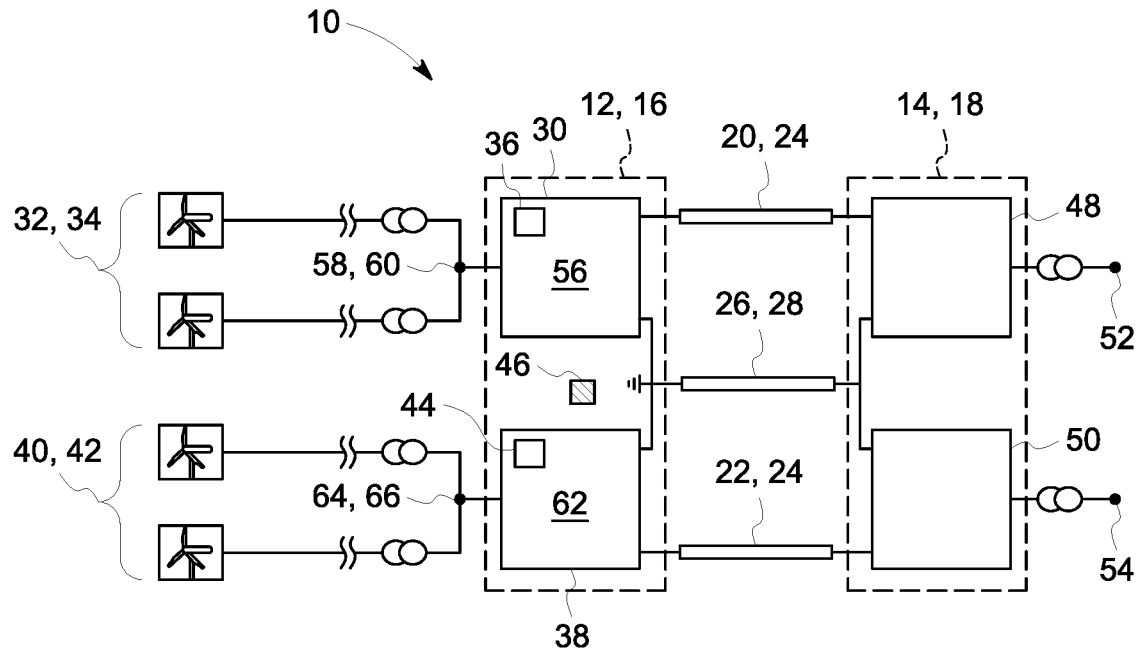
FIG. 1 shows a schematic view of a bipole power transmission scheme according to a first embodiment of the invention operating under normal conditions.

A bipole power transmission scheme according to a first embodiment of the invention is designated generally by reference numeral 10, as shown in FIG. 1.

The bipole power transmission scheme 10 includes a first converter station 12 which is positioned remotely from a second converter station 14. In the embodiment shown, the first converter station 12 is an offshore converter station 16 and the second converter station 14 is an onshore converter station 18, although in other embodiments of the invention this need not necessarily be the case, e.g. both converter stations 12, 14 may be onshore converter stations.

Moreover, in the embodiment shown the bipole power transmission scheme 10 of the invention includes the second converter station 14, i.e. the onshore converter station 18, but other embodiments of the invention may include only the first converter station 12, e.g. only an offshore converter station. Such other embodiments of the invention may be applicable when a third party owns or manages the second converter station and the downstream power transmission network associated therewith, and it is intended for the bipole power transmission scheme of the invention to inter-operate with such a second converter station and associated power transmission network.

Returning to the embodiment shown, the first and second converter stations 12, 14, i.e. the offshore and onshore converter stations 16, 18, are interconnected by first and second transmission conduits 20, 22, i.e. first and second 'poles' (hence the scheme constituting a 'bipole' scheme) which permit the first, offshore converter station 16 to transmit power to the second, onshore converter station 18.

Each of the first and second transmission conduits 20, 22 is or includes a subsea cable 24, although in other embodiments of the invention one or other transmission conduit might be, or include, an underground cable, an overhead line, or a mixture of such cables and line.

The first and second converter stations 12, 14 are also interconnected by a return conduit 26 which is, or includes, a dedicated metallic return 28, which typically takes the form of a further subsea cable 24, although an electrical conductor of some other form may be used.

The first, offshore converter station 16 includes a first power converter 30 which electrically interconnects the first transmission conduit 20 with a first variable power source 32.

In the embodiment shown, the first variable power source 32 is a first offshore wind park 34 which includes a plurality of wind turbines (not shown). The first offshore wind park 34 is configured as an offshore AC grid which provides an AC power infeed to the first power converter 30, although this need not necessarily be the case in other embodiments of the invention.

In addition to the foregoing, the first power converter 30 also includes its own first converter controller 36 that is programmed to control the transfer of power from the first power source 32, i.e. the first offshore wind park 34, into the first transmission conduit 20 in the form of a DC power feed.

The first power converter 30 shown is a voltage source converter, although other types of power converter can be used.

The voltage source converter shown has a known configuration which includes three converter limbs, each of which is split into first and second limb portions, and each of which limb portion includes a chain-link converter. Each chain-link converter includes a plurality of series connected chain-link modules, while each chain-link module includes a number of switching elements which are connected in parallel with an energy storage device in the form of a capacitor (although other types of energy storage device, i.e. any device that is capable of storing and releasing energy to selectively provide a voltage, e.g. a fuel cell or battery, may also be used however).

The provision of a plurality of chain-link modules means that it is possible to build up a combined voltage across each chain-link converter, via the insertion of the energy storage devices, i.e. the capacitors, of multiple chain-link modules (with each chain-link module providing its own voltage), which is higher than the voltage available from each individual chain-link module.

Accordingly, each of the chain-link modules work together to permit the chain-link converter to provide a stepped variable voltage source. This permits the generation of a voltage waveform across each chain-link converter using a step-wise approximation. As such each chain-link converter is capable of providing a wide range of complex waveforms and thereby enable the voltage source converter to provide the aforementioned power transfer functionality, i.e. the transfer of power from the first power source 32, i.e. the first offshore wind park 34, into the first transmission conduit 20.

The first, offshore converter station 16 also includes a second power converter 38, which is also a voltage source converter and is configured in essentially the same manner as the first power converter 30, as described hereinabove.

However the second power converter 38 does, instead, electrically interconnect the second transmission conduit 22 with a second variable power source 40.

In the embodiment shown, the second variable power source 40 is a second offshore wind park 42, which similarly includes a plurality of wind turbines (not shown).

The second power converter 38 also similarly includes its own second converter controller 44 that is programmed to control the transfer of power from the second power source 40, i.e. the second offshore wind park 42, into the second transmission conduit 22 in the form of a DC power feed.

As with the first offshore wind park 34, the second offshore wind park 42 is similarly configured as an offshore AC grid which provides an AC power infeed to the second power converter 38, although this need not necessarily be the case in other embodiments of the invention.

Meanwhile, in the embodiment shown the second, onshore converter station 18 includes third and fourth power converters 48, 50 which are also voltage source converters, essentially configured in the same manner as the first and second power converters 30, 38 in the first, offshore converter station 16, albeit in a mirror image fashion. Other types of power converter, as well as other configurations of power converter, may however be included instead in the second, onshore converter station 18.

The third and fourth power converters 48, 50 are configured to transfer the DC power feed from the corresponding first or second transmission conduit 20, 22 to a corresponding first or second AC network 52, 54, and do so in response to the DC voltage of the corresponding first or second transmission conduit 20, 22. In other embodiments of the invention, however, the third and fourth power converters may instead be configured to transfer the DC power feeds from the first and second conduits, to a single AC network. In any event, both the third and fourth power converters 48, 50 operate in DC voltage control, and they continue to do so throughout the operation of the bipole power transmission scheme 10 of the invention, as described hereinbelow.

In addition to the foregoing, the bipole transmission scheme 10 also includes a converter station controller 46 which, in the embodiment shown, takes the form of a station controller that is located within the first converter station 12. In other embodiments of the invention, however, the converter station controller may take the form of a station controller which is located remote from the first converter station, for example in or adjacent to the second converter station. In still further embodiments of the invention, the converter station controller may take the form of one or other of the first and second converter controllers, or each such converter controller may define a converter station controller.

In use, and while the bipole power transmission scheme 10 is operating normally, the first converter controller 36 is programmed to control the first power converter 30 in a first grid-forming mode 56 in which the first power converter 30 maintains the first power source 32, i.e. the first offshore wind park 34, at a first voltage 58 and first frequency 60, i.e. the first power converter 30 regulates both the instantaneous AC frequency 60 and the AC voltage 58 of the first offshore wind park 34. The first power converter 30 is also able to provide a reactive current equal to any steady-state rated current during AC faults within the first offshore wind park 34.

Meanwhile, the second converter controller 44 is similarly programmed to control the second power converter 38 in a second grid-forming mode 62 in which the second power converter 38 maintains the second power source 40 at a second voltage 64 and second frequency 66, i.e. the second power converter 38 regulates both the instantaneous AC frequency 66 and the AC voltage 64 of the second offshore wind park 42. The second power converter 38 is similarly also able to provide a reactive current equal to any steady-state rated current during AC faults within the second offshore wind park 42.

The first and second grid-forming modes 56, 62 are completely independent of one another. In other words, the individual offshore wind parks 34, 42 are able to feed power, via the corresponding power converter 30, 38, into each transmission conduit 20, 22 independently of one another.

Figure 3:
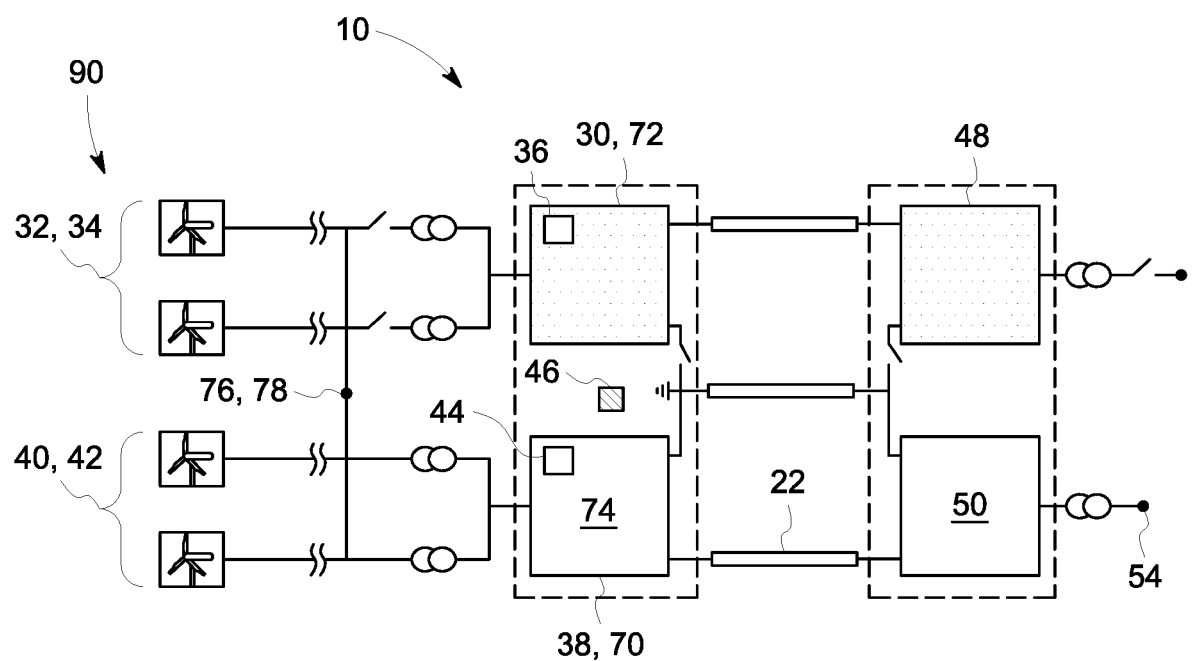
FIG. 3 shows a schematic view of the bipole power transmission scheme shown in FIG. 1 operating as an asymmetrical monopole.

In addition, the converter station controller 46 is programmed to selectively transition the bipole power transmission scheme 10 into an asymmetrical monopole configuration, as shown in FIG. 3. Moreover, the converter station controller achieves such a transition while maintaining the transfer of power from both the first and second power sources 32, 40.

Figure 2:
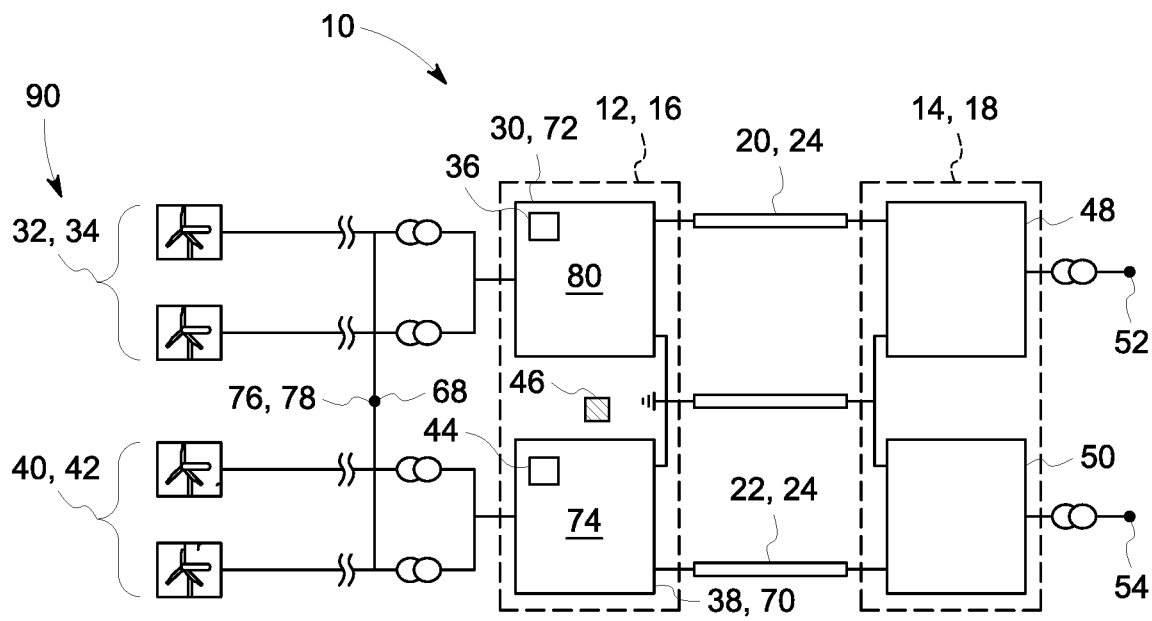
FIG. 2 shows a schematic view of the bipole power transmission scheme shown in FIG. 1 transitioning into an asymmetrical monopole configuration.

In the embodiment shown, the converter station controller 46 selectively transitions the bipole power transmission scheme 10 into an asymmetrical monopole configuration by electrically interconnecting the first and second power sources 32, 40, i.e. by electrically interconnecting the first and second offshore wind parks 34, 42, as shown in FIG. 2.

More particularly, the first and second offshore wind parks 34, 42 are, temporarily, interconnected at a point of common coupling 68 which, in the embodiment shown, is via an AC bus bar (connected via bus couplers) that is common to both power converters 30, 38, to form a combined power source 90.

Prior to interconnecting the first and second offshore wind parks 34, 42, the converter station controller 46 is programmed to synchronise the voltages 58, 64 and frequencies 60, 66 of the first and second offshore wind parks 34, 42, i.e. the first and second power sources 32, 40, with one another. In addition, as well as synchronising the voltage magnitude 58, 64 and frequency 60, 66, the phase angles of the first and second power sources 32, 40 are also synchronised.

For example, the converter station controller 46 may cause the second converter controller 44 to synchronise the first voltage 58 and frequency 60 of the first offshore wind park 34 with the second voltage 64 and frequency 66 of the second offshore wind park 42. This may be done by sending a measurement of the second voltage 64 to the first converter controller 36 which, in turn, modifies the first voltage 58 and frequency 60 accordingly. More particularly, in the embodiment shown, the measured voltage includes the instantaneous three phase voltages from which the magnitude, phase angle and the frequency of the three phase voltages can be determined.

Following the electrical interconnection of the first and second offshore wind parks 34, 42, i.e. to form a combined power source 90, both the first and second power converters 30, 38 initially continue to operate in their respective first and second first grid-forming modes 56, 62. However, while the second converter controller 44 continues to control the second power converter 38 to maintain the second power source 40, i.e. the second offshore wind park 42, at the second voltage 64 and second frequency 66, the first converter controller 36 modifies the first grid-forming mode 56 of the first power converter 30 so that the first power converter 30 instead causes the first power source 32, i.e. the first offshore wind park 34, to operate at the second voltage 64 and second frequency 66.

In other embodiments of the invention, not shown, the second voltage and frequency of the second offshore wind park may instead be synchronised to match the first voltage and frequency of the first offshore wind park.

In addition, while initially continuing to operate the first and second power converters 30, 38 in the aforementioned first and second grid-forming modes 56, 62, droop control is applied to both power converters 30, 38. This is to prevent any interaction between the respective converter controllers 36, 44 of the said first and second power converters 30, 38.

Thereafter, the converter station controller 46 is programmed to continue the process of transitioning the bipole power transmission scheme 10 into an asymmetrical monopole configuration by configuring one power converter 30, 38, which is connected to the transmission conduit 20, 22 that is intended to continue transmitting power in the monopole configuration, as a master converter which operates in a grid-forming mode, and configuring the other power converter 30, 38, which is connected to the transmission conduit 20, 22 that is intended to cease transmitting power in the monopole configuration, as a slave converter which operates in a grid-following mode controlled by the master converter.

For example, and continuing with the example set out above, the converter station controller 46 may be programmed to configure the second power converter 38 as a master converter 70 (noting that the second transmission conduit 22 is thereby intended to continue transmitting power in the monopole configuration), and to configure the first power converter 30 as a slave converter 72 (similarly noting that the first transmission conduit 20 is thereby intended to cease transmitting power in the monopole configuration), as shown in FIG. 2.

As indicated above, the master converter 70, e.g. the second power converter 38, operates in a grid-forming mode. In practice this means that the second power converter 38 operates in a third grid-forming mode 74 in which it maintains the, now electrically interconnected first and second power sources 32, 40, i.e. the combined power source 90, at a third voltage 76 and third frequency 78. The third voltage 76 and frequency 78 may not be the same as the second voltage 64 and frequency 66 at which the second power converter 38 was previously maintaining the second power source 40 and, indirectly through voltage synchronisation, also the first power source 32.

Meanwhile the slave converter 72, e.g. the first power converter 30, is now configured to operate in a grid-following mode 80.

More particularly, the slave converter 72, e.g. the first power converter 30, measures the third voltage 76 and frequency 78 of the combined power source 90, i.e. the voltage and frequency at the point of common coupling 68, and thereafter synchronises its output voltage with that of the combined power source 90, i.e. synchronises its output voltage with the third voltage 76 and frequency 78.

In other words, the slave converter 72 locks onto the third voltage 76 generated by the master converter 70, such that the slave converter 72 is now considered to be in power control. As such, a grid-following converter, i.e. the slave converter 72, matches the AC voltage 76 and frequency 78 of the combined power source 90. The slave converter 72 may also able to provide reactive current equal to the steady-state rated current during AC faults within the combined power source 90.

Finally, the converter station controller 46 is programmed to complete the process of transitioning the bipole power transmission scheme 10 into an asymmetrical monopole configuration by controlling the slave converter 72, e.g. the first power converter 30, to reduce to zero the power being fed into the transmission conduit connected therewith, e.g. into the first transmission conduit 20.

Accordingly, in the example embodiment described herein, the converter station controller 46 causes the second converter controller 44 to complete the transition by reducing to zero the power being fed into the first transmission conduit 20 by the first power converter 30.

Once the power being fed into the first transmission conduit 20 reaches zero, each of the first and third power converters 30, 48 is blocked, and the converter station controller 46 disconnects the slave converter 72, e.g. the first power converter 30, from the combined power source 90. The converter station controller 46 also disconnects the return conduit 26 from the first and third power converters 30, 48, and the third power converter 48 from the first AC network 52, to thereby allow maintenance and/or repair of the corresponding first transmission conduit 20 to take place.

Meanwhile, the power from combined power source 90, i.e. the power from both offshore wind parks 34, 42, passes solely through the master converter 70, e.g. the second power converter 38, (providing the power rating of the second power converter 38 is not exceeded) and into the second transmission conduit 22 connected therewith, and hence onwards into the second AC network 52, thus avoiding an interruption in power transfer from both the first and second power sources 32, 40. Meanwhile, voltage and/or frequency regulation of the combined power source 90 by the master converter 70, i.e. the second power converter 38, can be used to help ensure that the power rating of the second power converter 38 is not exceeded. Moreover, in embodiments where direct telecommunication between the converter station controller 46 and one or more of the first and second offshore wind parks 34, 42, this can also be used to limit the power of the combined power source 90 to below the rating of the second power converter 38.

The invention claimed is:

1. A bipole power transmission scheme comprising a first converter station positioned in-use remote from a second converter station, and first and second transmission conduits to in-use interconnect the first converter station with the second converter station and thereby permit the first converter station to transmit power to the second converter station, the first converter station including:
   a first power converter electrically interconnecting the first transmission conduit with a first variable power source and in-use transferring power from the first variable power source into the first transmission conduit; and
   a second power converter electrically interconnecting the second transmission conduit with a second variable power source and in-use transferring power from the second variable power source into the second transmission conduit, wherein the first and second variable power sources are not interconnected to each other in a first stage of the bipole power transmission scheme,
   the bipole transmission scheme further including a converter station controller programmed to selectively transition the bipole power transmission scheme into an asymmetrical monopole configuration, while maintaining the transfer of power from both the first and second variable power sources, by:
      establishing a temporary bus bar electrically interconnecting the first and second variable power sources in a second stage of the bipole power transmission scheme;
      configuring one power converter connected to the transmission conduit intended to continue transmitting power in the monopole configuration as a master converter operating in a grid-forming mode in the second stage;
      configuring the other power converter connected to the transmission conduit intended to cease transmitting power in the monopole configuration as a slave converter operating in a grid-following mode in the second stage; and
      controlling the slave converter to reduce to zero the power being fed into the transmission conduit connected therewith in a third stage of the bipole power transmission scheme.

2. A bipole power transmission scheme according to claim 1, wherein the converter station controller is further programmed, once the power being fed into the transmission conduit connected with the slave converter reaches zero, to disconnect the slave converter from the electrically interconnected first and second variable power sources.

3. A bipole power transmission scheme according to claim 1, wherein the first and second variable power sources are interconnected temporarily at a point of common coupling.

4. A bipole power transmission scheme according to claim 1, wherein, prior to interconnecting the first and second variable power sources, the converter station controller is programmed to synchronise the voltages and frequencies of the first and second variable power sources with one another.

5. A bipole power transmission scheme according to claim 1, wherein, following interconnection of the first and second variable power sources, droop control is initially applied to both power converters.

6. A bipole power transmission scheme according to claim 1, wherein the master converter operating in the grid-forming mode maintains the voltage and frequency of the power source with which it is connected.

7. A bipole power transmission scheme according to claim 1, wherein the slave converter operating in grid-following mode measures the voltage and frequency of the variable power source with which it is connected in order to synchronise its output voltage with the variable power source.

8. A bipole power transmission scheme according to claim 1, wherein the first converter station is an offshore converter station and at least one of the first and second variable power sources is an offshore wind park.

9. A bipole power transmission scheme according to claim 1, wherein the second converter station interconnected with the first converter station by the first and second transmission conduits.

10. A method of operating a bipole power transmission scheme comprising a first converter station positioned in-use remote from a second converter station, and first and second transmission conduits to in-use interconnect the first converter station with the second converter station and thereby permit the first converter station to transmit power to the second converter station, the first converter station including:
   a first power converter electrically interconnecting the first transmission conduit with a first variable power source and in-use transferring power from the first variable power source into the first transmission conduit; and
   a second power converter electrically interconnecting the second transmission conduit with a second variable power source and in-use transferring power from the second variable power source into the second transmission conduit, wherein the first and second variable power sources are not interconnected to each other in a first stage of the bipole power transmission scheme, the bipole power transmission scheme further including a converter station controller, and the method comprising the step of having the converter station controller selectively transition the bipole power transmission scheme into an asymmetrical monopole configuration, while maintaining the transfer of power from both the first and second variable power sources, by:

establishing a temporary bus bar electrically interconnecting the first and second variable power sources in a second stage of the bipole power transmission scheme;

configuring one power converter connected to the transmission conduit intended to continue transmitting power in the monopole configuration as a master converter operating in a grid-forming mode in the second stage;

configuring the other power converter connected to the transmission conduit intended to cease transmitting power in the monopole configuration as a slave converter operating in a grid-following mode in the second stage; and controlling the slave converter to reduce to zero the power being fed into the transmission conduit connected therewith in a third stage of the bipole power transmission scheme.

* * * * *